A. T. WEISS.
LABELING MACHINE.
APPLICATION FILED AUG. 1, 1910.

1,029,900.

Patented June 18, 1912.
5 SHEETS—SHEET 1.

Fig.1.

Witnesses
Walter B. Payne
Russell B. Griffith

Inventor
Albert T. Weiss
By Church & Rich
his Attorneys

A. T. WEISS.
LABELING MACHINE.
APPLICATION FILED AUG. 1, 1910.

1,029,900.

Patented June 18, 1912.

Witnesses
Walter B. Payne.
Russell B. Griffith

Inventor
Albert T. Weiss

By Church & Rich
his Attorneys

UNITED STATES PATENT OFFICE.

ALBERT T. WEISS, OF ROCHESTER, NEW YORK, ASSIGNOR TO YAWMAN & ERBE MANUFACTURING COMPANY, OF ROCHESTER, NEW YORK, A CORPORATION OF NEW YORK.

LABELING-MACHINE.

1,029,900.     Specification of Letters Patent.     Patented June 18, 1912.

Application filed August 1, 1910. Serial No. 574,871.

*To all whom it may concern:*

Be it known that I, ALBERT T. WEISS, of Rochester, in the county of Monroe and State of New York, have invented certain new and useful Improvements in Labeling-Machines; and I do hereby declare the following to be a full, clear, and exact description of the same, reference being had to the accompanying drawings, forming a part of the specification, and to the reference-numerals marked thereon.

My present invention relates to machines for applying labels to bottles or other articles, packages or containers, and has for its object to provide a machine of this character which will be of a simple and durable construction and accurate in its operations, and by the use of which labels may be expeditiously applied, either singly or in multiple.

Another object of the invention is to make the various parts and mechanisms convenient and readily accessible to the operator, and a further object is to adapt certain of the operating parts so that they will work effectively with the same degree of efficiency against label receiving surfaces of peculiar contour or differing in contour.

The improvements are further directed toward general and particular features of labeling machine construction, one being a disposal of the parts in such manner that the machine as a whole requires very little floor space.

To these and other ends the invention consists in certain improvements and combination of parts, all as will be hereinafter more fully described, the novel features being pointed out in the claims at the end of the specification.

To first give an idea of the general plan of the particular organized machine herein illustrated, it comprises a stationary work support upon which the articles are placed and removed, preferably by hand; a stationary label holder and a stationary adhesive receptacle; a reciprocating picker that moves into alinement with and against the labels after being coated with adhesive, and thence into alinement with and against the article on the work support; a stripper that transfers the label from the picker to the article and holds it clamped thereon, and wipers that operate to smooth the label down upon the receiving surface.

Referring more particularly to the drawings, though the improvements involved are considered to be more widely applicable, the present machine is specially designed for the application of neck and body labels to bottles, and comprises a suitable base 1 upon which is supported a main frame embodying front and rear standards 2 and 3 having yoke shaped upper portions 4 and 5 respectively, the rear standard being considerably shorter than the front one. Journaled in the standards to extend preferably from front to rear of the machine is a main driving shaft 6 having a driving pulley 7 thereon that may run continuously, but which is preferably operatively connected with the drive shaft 6 through the medium of a clutch mechanism, indicated generally by 8 and controlled by a lever 9, connected with an operating lever 10 having a treadle attachment 11 at the front of the machine by means of which the operator may conveniently and quickly start or stop its effective movements.

Projecting forwardly from the front standard is a bracket 12 on which is preferably adjustably mounted as to height through a slot and pin device 13, any suitable form of bottle rest or work support 14, and also projecting forwardly from the same standard directly above the work support is a pair of bracket arms 15, having guiding grooves 16 on their inner sides to detachably receive the supporting flanges 17 of an adhesive receptacle 18. Turning continuously in the latter, while the machine is operating, is a mixing roller 19 that runs in contact with and drives a feed roller 20 which overhangs the rear edge of the receptacle, and thus constantly carries on its periphery a film of fresh adhesive.

Figure 9:
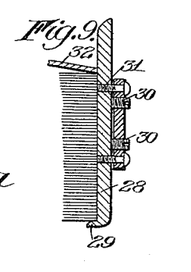
Fig. 9 is a detail section through one of the label holding boxes showing the construction of the guide stake, taken on the line 9—9 of Fig. 7.
Figure 11:
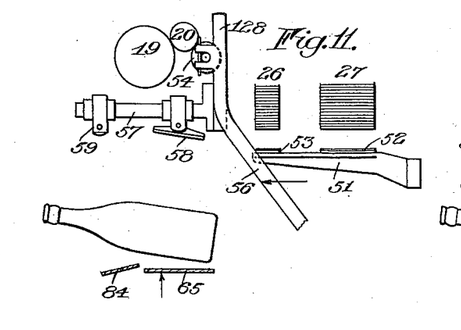
Figs. 11, 12, 13, 14, 15 and 16 are diagrammatic illustrations of the parts concerned in the actual application of the label showing their relative positions throughout the cycle of operation of the machine.

Projecting rearwardly from the front standard preferably at about the level of the adhesive receptacle are a pair of bracket arms 21, having guiding grooves 22 in their inner sides to detachably receive the supporting flanges 23 of a pair of label boxes 24 and 25, the larger (and in the present instance body label box) being in rear of the other. Each box is of the bottom delivery type in which the piles of labels 26 and 27 are supported, face down, on vertically disposed guide stakes 28 lining the walls of the boxes, and provided with inwardly turned toes 29, that engage the edges of the lowermost label, but permit its removal singly by the picker hereinafter described. Referring to Fig. 9, each stake is subject to the inward presence of screws threaded in a wall of the box and permitting movement of the stake inwardly, while outward movement is effected by screws 31, threaded into the stake and having headed portions on the exterior of the supporting wall, these adjustments being designed to compensate for slight differences in the sizes of different piles of labels.

The piles of labels are positively fed downwardly and picking contact is resisted in each instance through the medium of a follower plate 32 (Fig. 6) upon which bears the weight of a follower rod 33, guided at 34 in a bar 35 spanning the label box, and having its opposite ends pivotally supported by means of removable pins 36 in standards 37, that are adjustable longitudinally of the bracket arms 21 in guides 38 on the top faces thereof by means of bolts 39 to follow the movements of the label boxes as they are adjusted in their lateral guides 22. Gravity actuated pawls 40 and 41 (Fig. 8) pivoted at 42 and 43, respectively, on a bracket 44 forming part of the bar 35 coöperate with a series of teeth 45 on one side of the follower rod 33 to resist the upward movement thereof. These pawls are so spaced with relation to the spacing of the teeth that one is in effective engagement with a tooth at the time the other lies between two teeth, as shown in figure, so that without reducing the size and, therefore, the strength of the teeth, provision is nevertheless made for a highly sensitive feed. By lifting the pawls the follower rod may be quickly adjusted to its approximate position or entirely withdrawn from its guide, while ready access is had to either label box for the removal of labels, or the insertion of fresh supplies, by lifting the whole follower device with the bar 35 on one or the other of its pivots 36.

Arranged beneath the label holder in rear of the front standard, but projecting forwardly toward the latter, is a rising and falling bed 46 having a stem 47 provided with upper and lower pairs of lugs 48, that travel on guide rods 49 passing through the yoke 5 of the rear standard, one pair of lugs operating within the yoke and the other on the ends of the guide rods which project above it. A carriage 50 is arranged to reciprocate from front to rear of the machine on and relatively to the bed 46, and suitably mounted on this carriage is a forwardly projecting picker fork 51 having on its upper side a body label picking surface 52 and a neck label picking surface 53. The picker reciprocates horizontally on its bed from a position above and in alinement with the work support 14 or an article arranged thereon to a rearward position in alinement with and beneath the label boxes 24 and 25, and moves vertically with the reciprocations of the bed 46 between the first mentioned movements into and out of engagement with the labels and toward and from the article on the work support.

As the picker starts on its rearward travel relatively to the bed 46 its picking surfaces 52 and 53 are engaged by an adhesive distributing roller 54, which reciprocates vertically in guiding brackets 55 on the main frame on a carrying frame 56. In so doing, it passes from its engaging position between the bracket arms 15 of the receptacle 18 to a position in contact with the feed roller 20 from which it receives its supply of adhesive. To come in contact with this distributing roller 54, the picker 51 must first rise with the rising movement of its bed 46, from its position against the article on the work support, and in so doing it frees itself of the labels that have just been presented. These labels are in the meantime held clamped against the article by a stripper 57, having yielding body and neck label stripper pads 58 and 59 (Fig. 6) thereon, and this stripper is preferably carried on the same carrying frame 56 with the distributing roller 54.

After the picker has received its coating of adhesive and moved rearwardly beneath the label holder, and while it is moving upwardly against the labels to pick the lowermost ones the carrier 56 moves upwardly returning the distributing roller 54 to run in contact with its feed roller 20, and raising the stripper 57 to an elevated position, whereby the article just labeled is free to be withdrawn and another one inserted in its place. The picker having received its labels, due to a rising movement of the bed 46, moves forwardly, beneath and clear of both the stripper and distributing roller, to a position above the article. As it moves downwardly thereafter with the falling movement of its supporting bed 46 to place the new labels against the article, the carrier 56 also moves down, and the stripper 57 passing between the arms of the picker fork moves quickly into engagement with the labels, clamping them against the article. The distributing roller 54 necessarily being also down, the picker then rises into engagement therewith and the operation described is repeated.

Figure 7:
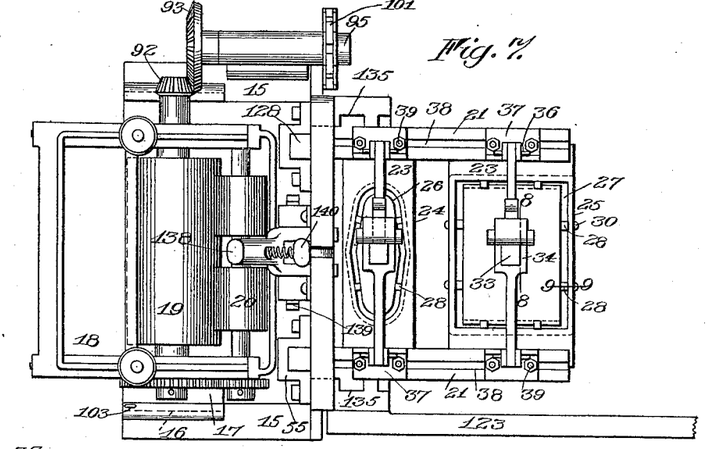
Fig. 7 is a top plan view of the label holding and pasting devices.

It is sometimes desired to interrupt the label feed to the picker without at the same time preventing the operation of the various other mechanisms, as for instance, during adjustment or tuning up of the parts, say, when the paste pot has just been filled and the various paste transferring devices have not run sufficiently long to become properly coated. To this and other ends, I mount the label holding bracket 21 in vertical guides 135 in the front standard of the main frame (Figs. 6 and 7) and connect it by a pivoted link 136 to the arm 137 of an operating lever 138 pivoted at 139 to the frame. A trigger lever 140, pivoted at 141 to the operating lever 138, controls a pawl 142 that is arranged to engage the cross piece or abutment 143 on the frame when the operating lever 138 is depressed, and to maintain the resulting elevated position of the label holder bracket. When the latter is so disposed, the label boxes are elevated to such a degree that the range of upward movement of the picker 51 is too limited for it to reach the lowermost labels, and hence while it passes through its picking movement as usual the latter is rendered ineffective.

As soon as the labels are firmly clamped in position by the stripper 57 the wiping mechanism starts its operation of smoothing the labels down upon their respective receiving surfaces, and this mechanism will now be described.

Figure 2:
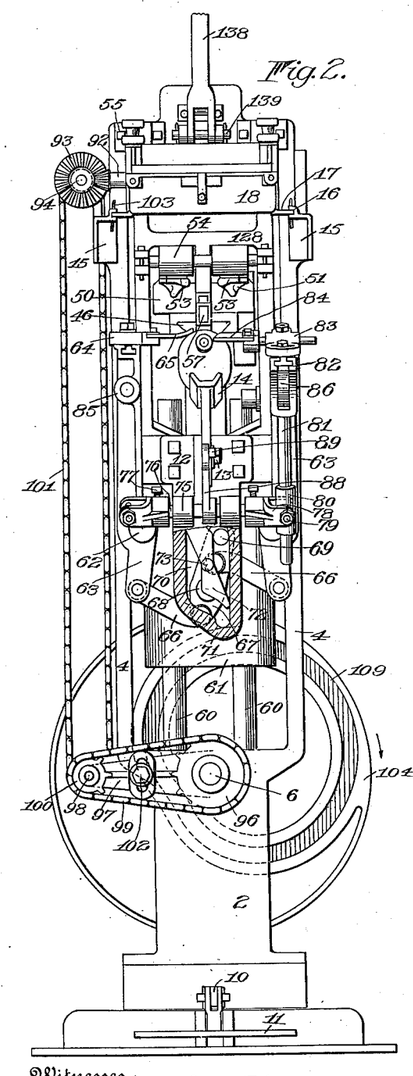
Fig. 2 is a front elevation thereof with one of the neck label wipers and its carrying parts removed, the view being taken partly in section through the wiper actuating mechanism.
Figure 3:
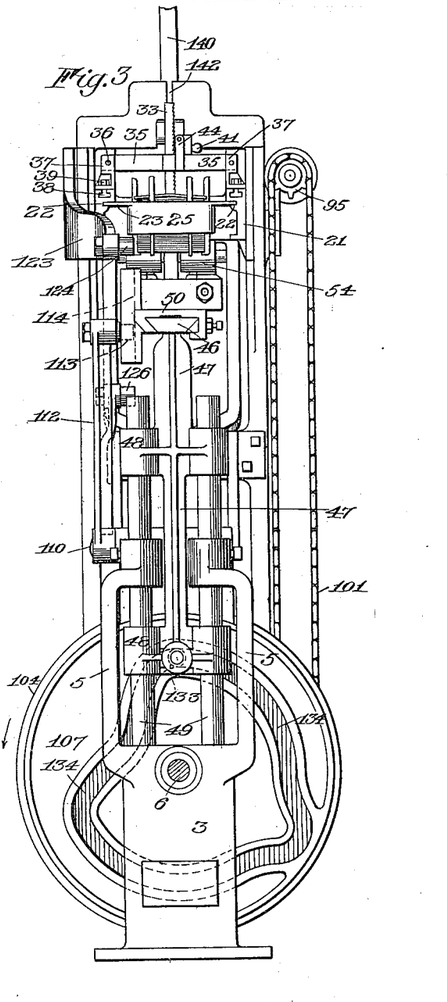
Fig. 3 is a rear elevation.

The front standard 2 of the main frame of the machine is fitted with guides 60 (Fig. 2) upon which is arranged to reciprocate vertically the carriage 61 and pivoted at 62 on this carriage in a manner disposing them upon opposite sides of the work support 14 are two laterally vibrating wiper arms 63, having heads 64 secured thereon and fitted with flexible wipers 65, which I prefer to construct of rubber plates or brushes which conform to the surfaces of the article acted upon, and drag across the coated labels with a smoothing effect.

The wipers move downwardly from an elevated position above the rest 14 past the same, and in contact with the article thereon with the downward movement of the carriage 61, and return with the upward movement of the latter. In order that they may clear the article and work support on their upward movement, without disturbing the label just affixed, and to give an opportunity for the operator to remove the labeled article and insert another one, I give to the wipers an independent spreading or lateral movement relatively to the work support and to their main carriage. To this end, the arms or levers 63 are connected by means of links 66 with an oscillating member 67 pivoted at 68 to the carriage 61. This member 67 is rocked to and fro to give an inward and outward lateral movement to the arms or levers 63 by a projection 69 thereon coöperating with a cam track 70 in the rear face of a depending extension 71 of the work supporting bracket 12. The projection traverses the cam under the guidance of a switch 72, journaled at 73 in the extension and actuated by a spring 74 (Fig. 1), the switch acting as will be readily understood, to direct the projection 69 up one side of the track with the rising of the carriage 61 and downwardly on the other side with the downward movements of the carriage.

Figure 1:
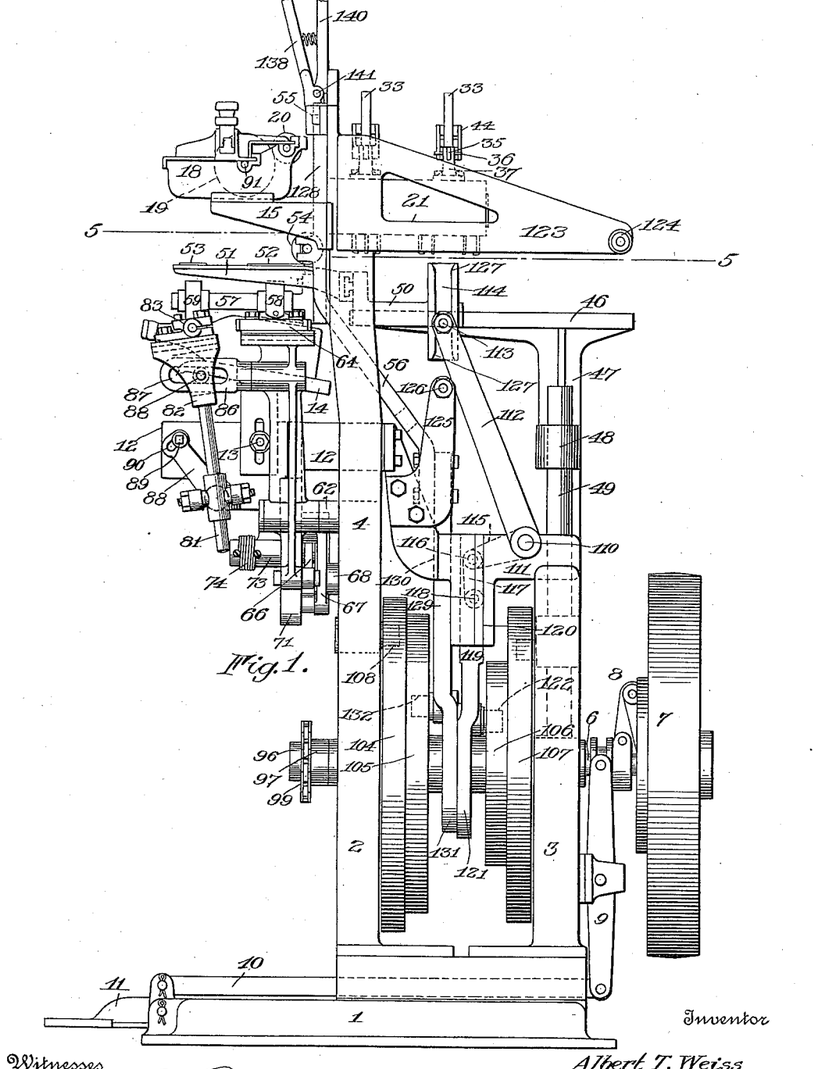
Figure 1 is a side elevation of a labeling machine constructed in accordance with and illustrating one embodiment of my invention.
Figures 4, 5, 6:
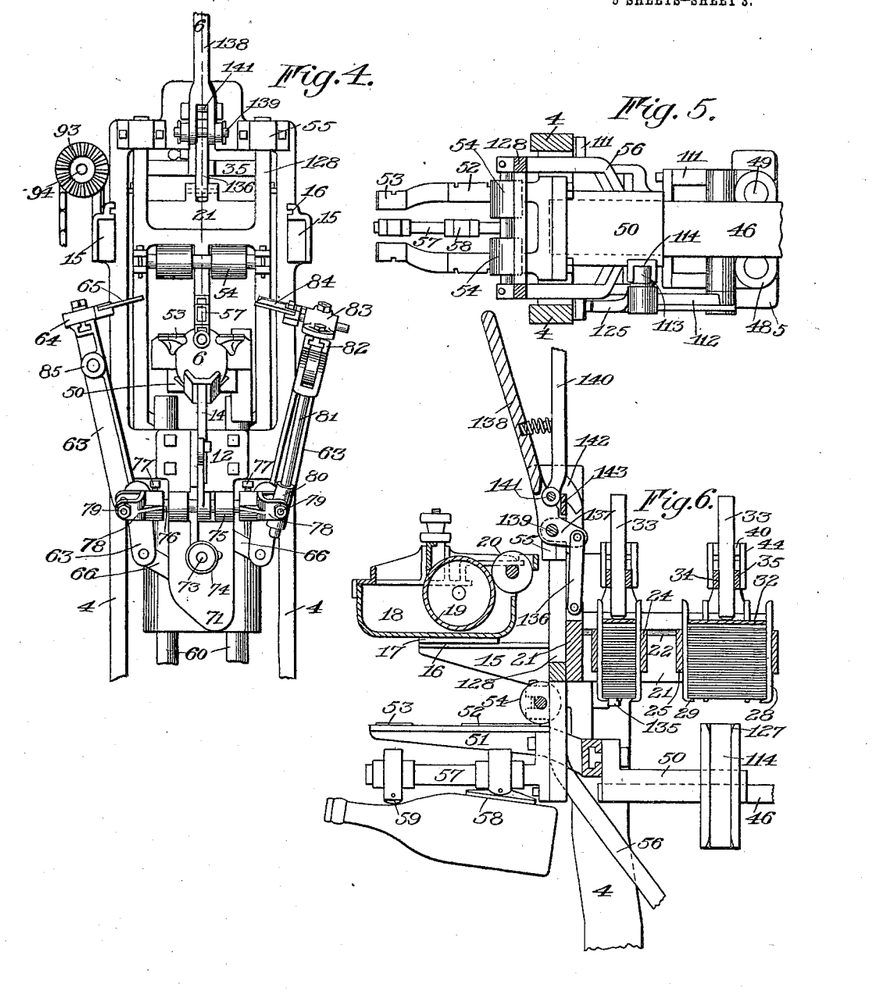
Fig. 4 is a detail front elevation of the wiper mechanism and adjacent parts.
Fig. 5 is a detail plan view of the picker mechanism taken in section substantially on the line 5—5 of Fig. 1.
Fig. 6 is a detail central vertical section through the picker, label holder and the pasting devices taken substantially on the line 6—6 of Fig. 4.

The wipers just described are those utilized in the present machine for affixing the large body labels. The neck label wipers are particularly designed for fitting them to the different work they must accomplish, in that, while the neck labels are sometimes pasted squarely around the neck of the bottle in the same manner that the body labels are applied to the concentric body portion, it is at times desired to place them against the shoulder of the bottle formed by the junction of the neck and body portions. This surface lies at an angle to the body surface and therefore to adapt the neck wipers to the surface acted upon so that they move squarely against it, and do not allow the pasted label to slip or slide to a distorted position, the neck wipers are made to move at an angle to the path of movement of the body wipers and their carriers in guides, the inclinations of which longitudinally of the work support may be varied to suit bottles or other articles of different shapes, the whole arrangement being as follows: Referring more particularly to Figs. 1 and 4, a journal 75 in an extension of the work supporting bracket 12 carries a transversely extending rock shaft 76, having adjustably mounted thereon by means of set screws 77, or otherwise, a pair of knuckles 78, to pivotally support at 79 a pair of preferably tubular guiding sockets 80, that are thus arranged to rock laterally of the work support and to receive the stems 81 of a pair of wiper carrying members 82, arranged on opposite sides of the work support. Wiper heads 83 having various adjustments on the members 82 hold the neck wiper pads 84 which may be substantially the same as the body wipers 65.

In order to impart the wiping movement to the neck wipers along with the main wiper carriage 61 and its body wiper carrying devices, each body wiper carrying arm 63 is provided with a bearing 85 for a swiveled bracket 86, provided with a horizontal slot 87 to receive a roller or projection 88 on the carrying member 82 of each neck wiper to form a sliding connection with the latter that is not disturbed by the lateral rocking movement of either.

When it is desired to apply labels to the sloping shoulder of a bottle for instance, such as is shown presented in Figs. 1 and 6, the socket guides 80 are adjusted or inclined in a plane longitudinally of the bottle and work support to such an extent as will give to the neck wipers 84 a path of movement squarely against said shoulder portion, as the carrying members 82 or rather their stems 81 are reciprocated in the socket through the medium of the brackets 86 with the reciprocation of the carriage 61 and wiper carrying arms 63. These adjustments are brought about in the present instance, to effect the simultaneous movement of the guiding sockets, through rocking the shaft 76 by means of an arm 88 fixed thereto and capable of being secured in different positions against the work supporting bracket 12 by a bolt or pin 89 operating in the slot 90 therein. If for any reason it should be desirable to have the respective neck wipers travel at different relative inclinations, the knuckles 78 may be separately and independently adjusted on the shaft 76 by means of the set screws 77. The lateral movements of the neck wipers are, of course, necessarily coincident with those of the body wipers, because of the manner in which they are connected.

The mixing roller 19 in the adhesive receptacle 18 preferably runs constantly during the operation of the machine in order that the feed roller 20 may always carry a coating of freshly mixed adhesive for instantaneous communication to the distributer when so called upon. The shaft 91 of the mixing roller is therefore in the present instance provided at one end with the bevel gear 92 (Figs. 2 and 7) meshing with the bevel gear 93 on a short jack shaft 94, suitably journaled at one side of the main frame and carrying a sprocket 95 at its other end. The forwardly projecting end of the drive shaft 6 is also provided with a sprocket 96, and with a loosely mounted arm 97 carrying a shaft 98 driven by a chain 99 passing over a sprocket 100 thereon, and over the sprocket 96 on the drive shaft. A second sprocket (not shown) on the shaft 98 drives a chain 101 that passes upwardly over the sprocket 95 and the arm 97 may be secured in various positions of adjustment against the main frame by a device 102, so that the tension on the chain may be varied.

As before stated, the adhesive receptacle 18 is fitted with laterally extending supporting and guiding flanges 17 that are received within the channels 16 of the brackets 15, by which arrangement the receptacle may be withdrawn for filling, cleaning or other purposes and re-inserted. The means described for driving the mixing roller in no way interfere with such movements because the bevel gear 92 carried with the receptacle can be moved into and out of mesh with its coöperating gear 93 on the frame at will. To retain them in mesh and to hold the receptacle in its operative position the latter is locked in its guide by means of removable pins 103, or in any other suitable manner.

The means employed in the present instance for actuating the various parts and mechanisms described comprise a plurality of cam disks 104, 105, 106 and 107 respectively, fixed on the drive shaft 6.

A roller or projection 108 on the wiper carriage 61 coöperates with a cam track 109 in the disk 104 to reciprocate the carriage and operate the wiping mechanism.

The picker carriage 50 is reciprocated horizontally on the rising and falling bed 46 by means of a bell crank lever pivoted at 110 to a bridging portion 111 of the main frame connecting the front and rear standards 2 and 3 thereof. A long upper arm 112 of the bell crank carries a roller or projection 113 operating in a vertical guide way 114 in the carriage 50, while the lower or shorter arm 115 is pivoted at 116 to a link 117 in turn pivoted at 118 to a vertically disposed member 119 reciprocating in a guide 120 in the bridging portion 111. The member 119 has a lower yoked end 121 embracing the drive shaft 6 and is provided with a roller or projection 122 coöperating with a cam track in the disk 106.

To center the movements of the picker 51 during its joint movements with the bed 46 toward and from the article and the label piles respectively, and to lock it temporarily thereon so that it will move with precision, and both receive the labels and deliver them at exactly the same points each time, I provide a bracket 123 projecting rearwardly from the upper portion of the front standard 2 adjacent to the label box, and which carries a centering roller or device 124 and a rearwardly and upwardly projecting bracket 125 thereon beneath the first, fitted with a projecting roller or centering device 126. As the bed and picker carriage move upwardly to pick the labels, the guide 114 receives the device 124, the carriage being in its rearward position on the bed, and when in its forward position and moving downwardly with the bed to present the labels on the picker to the article, the guide coöperates in a similar manner with the centering roller 126, for which purposes both receiving ends of the guide are flared slightly as at 127.

The carrier frame 56 for the distributing roller 54 and stripper 57 extends through the yoke 4 of the front standard 2, and has a forwardly offset portion 128 that operates in the guides 55 before mentioned, and a rearwardly arranged operating portion 129. The latter is also guided in the bridging portion 111 at 130 and terminates in a yoke 131 encircling the drive shaft 6 and provided with a roller or projection 132 coöperating with the cam track in the cam disk 105, through which the carrier frame is given its vertical reciprocation.

The rising and falling picker bed 46 is actuated by a roller or projection 133 at the lower end of the stem 47 thereof that coöperates with the cam track 134 on the cam disk 107.

Figures 8, 10:
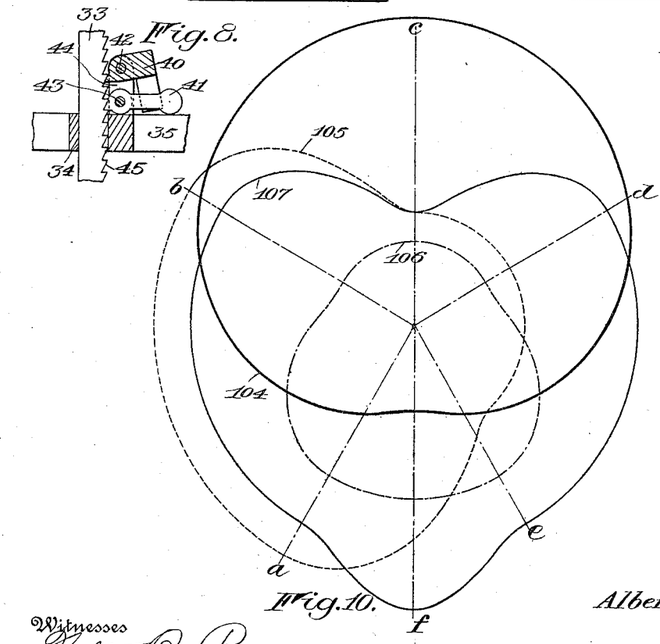
Fig. 8 is a detail section of the label holder follower taken substantially on the line 8—8 of Fig. 7.
Fig. 10 is a diagrammatic illustration of the actuating cam for the various parts showing their timed relation.
Figure 12:
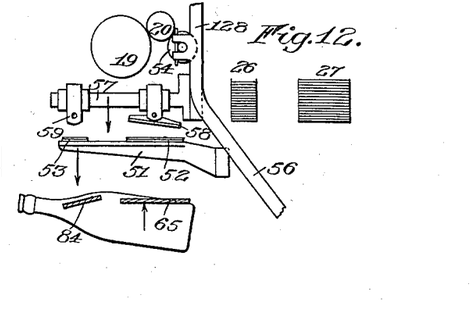

The relative arrangement of the actuating cams 104, 105, 106 and 107 on the drive shaft 6 bringing about the proper timing of the various parts of the mechanism is shown diagrammatically in Fig. 10, while in Figs. 11 to 16 are shown diagrammatically the relative positions of the principal elements of the machine that are concerned in the actual application of the label at different points throughout a cycle of operation. When the operating projections or rollers of the various mechanisms have positions with relation to the cams on the lines $a$, $b$, $c$, $d$, $e$ and $f$ of Fig. 10, the parts they control are in the positions of Figs. 11, 12, 13, 14, 15 and 16, respectively. Referring to these more particularly, in Fig. 11 the carrier frame 56 is raised; the distributing roller 54 is running in contact with its feed roller 20; the stripper 57 is raised, and the picker 51 has just picked the labels and is moving forwardly relatively to its bed 46 and at its intermediate level. The wipers 65 and 84 are below the bottle, are spread and have started upwardly. In Fig. 12 the distributing roller 54 and stripper 57 are in the same positions but are about to start downwardly as is the picker 51, which has reached its forward position directly over the bottle. The wipers 65 and 84 are still spread and moving upwardly but have not yet reached their extreme elevated positions.

Figure 13:
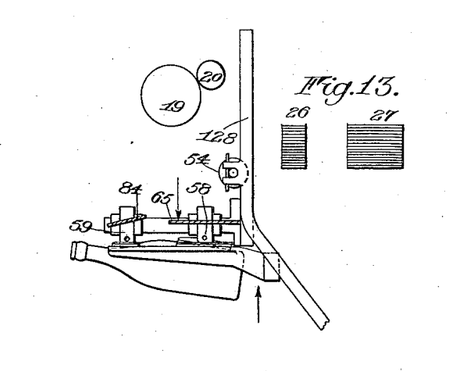
Figure 14:
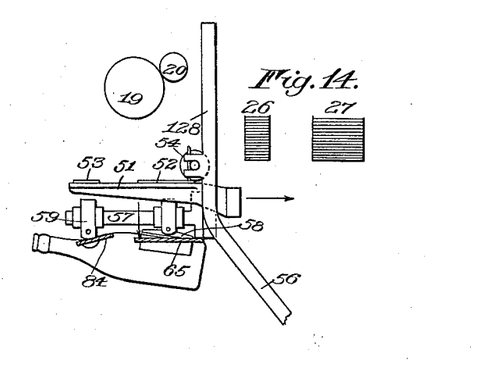

In Fig. 13 the distributing roller is down, out of contact with the feed roller; the picker has lowered the label against the article and the stripper has moved with it though at a faster rate and clamped the labels to the bottle. The wipers have reached their extreme elevated positions and are moving inwardly and downwardly toward the bottle. In Fig. 14 the distributing roller and stripper are in the same positions, but the picker has raised, freeing itself from the labels and is in its forwardly elevated position with its heel in contact with the distributing roller. The wipers are moving downwardly and are in the act of smoothing the labels on the bottle.

Figure 15:
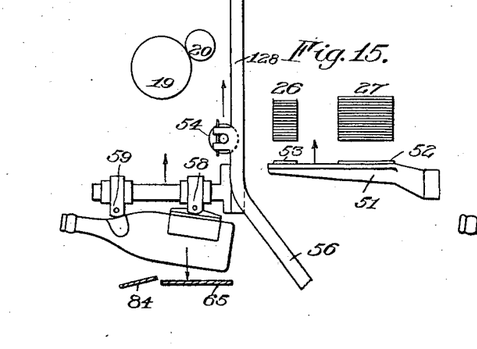

In Fig. 15 the distributing roller and stripper have started upwardly though the resiliency of the pads on the latter leaves them still in engagement with the labels, and the picker, having received its film of paste, is in its rearward position and moving upwardly against the piles of labels. The wipers have completed the affixing of the labels and are below the bottle but still moving downwardly out of the way.

Figure 16:
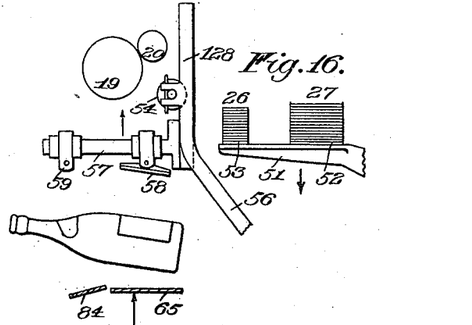

In Fig. 16 the distributing roller has nearly returned to contact with its feed roller; the stripper has moved upwardly and released the labeled bottle for its removal and the insertion of a fresh one, and the picker has been raised to engagement with the label piles detaching the lowermost one and is starting downwardly again. The wipers are spreading and on their upward trip as in Fig. 11.

I claim as my invention:

1. In a labeling machine, the combination with a main frame, of a rearwardly arranged overhanging bottom delivery label holder, a forwardly arranged work support, a picker reciprocating horizontally from front to rear of the machine and means for reciprocating the picker in vertical alinement with both the label holder and work support.

2. In a labeling machine, the combination with a main frame, of a rearwardly arranged overhanging bottom delivery label holder, a forwardly arranged work support, a rising and falling bed beneath the label holder and a picker arranged to reciprocate horizontally on the bed into vertical alinement with first the label holder and then the work support.

3. In a labeling machine, the combination with a work support and a label holder, one arranged in rear of and above the other, of a rising and falling bed and a picker reciprocating horizontally on the bed into vertical alinement with first one and then the other of said supporting and holding members.

4. In a labeling machine, the combination with a pasting device, a bottom delivery label holder in rear thereof and a work support beneath the pasting device, of a picker arranged to reciprocate horizontally from a position between the latter and the work support to a position beneath the label holder, and means for distributing adhesive from the pasting device to the picker.

5. In a labeling machine, the combination with a main frame embodying a standard, of a forwardly extending bracket and a rearwardly extending bracket on said standard, a work support arranged beneath one of said brackets, an adhesive receptacle supported by one of the brackets, a bottom delivery label holder supported by the other, a picker arranged to reciprocate between positions in one of which it is beneath one of the brackets and in the other of which it is between the other bracket and the work support and means for distributing adhesive from the paste receptacle to the picker.

6. In a labeling machine, the combination with a main frame embodying a standard, of a forwardly extending bracket and a rearwardly extending bracket on said standard, a work support arranged beneath the forward bracket, an adhesive receptacle supported by the latter, a bottom delivery label holder supported by the other bracket, a picker arranged to reciprocate horizontally from a position between the receptacle and work support rearwardly to a position beneath the label holder and back again, and an adhesive distributer arranged to engage the upper picker face of the picker during such rearward movement.

7. In a labeling machine, the combination with a main frame embodying a standard, of a forwardly extending bracket and a rearwardly extending bracket on said standard, a work support arranged beneath the forward bracket, an adhesive receptacle supported by the latter, a bottom delivery label holder supported by the other bracket, a picker arranged to reciprocate horizontally from a position between the receptacle and work support rearwardly to a position beneath the label holder and back again, and an adhesive distributer adapted to engage the face of the picker, the latter and the distributer being in contact during the rearward movement of the picker and out of contact during its return movement.

8. In a labeling machine, the combination with a main frame embodying a standard, of a forwardly extending bracket and a rearwardly extending bracket on said standard, a work support arranged beneath one of said brackets, a rising and falling bed beneath the other, an adhesive receptacle supported by one of the brackets, a bottom delivery label holder supported by the other and a picker arranged to reciprocate on the bed from a position beneath the label holder to one above the work support and back again and to move vertically toward and from both the label holder and work support.

9. In a labeling machine, the combination with a work support, of a rising and falling bed and a picker reciprocating on the bed relatively to the latter to move into and out of alinement with the work support and movable with the rising and falling movements of the bed toward and from the work support.

10. In a labeling machine, the combination with a label holder, of a rising and falling bed and a picker reciprocating on the bed relatively to the latter to move into and out of alinement with the label holder and movable with the rising and falling movements of the bed toward and from the label holder.

11. In a labeling machine, the combination with a label holder and a work support, of a rising and falling bed, a picker movable on the bed into and out of alinement with said holder and support, respectively, and movable with the rising and falling movements of the bed toward and from one of them and means for centering the picker during said last mentioned movement to prevent a change in its position on the bed.

12. In a labeling machine, the combination with a frame having a label holder and a work support mounted thereon, of a rising and falling bed, a picker movable on the bed into and out of alinement with said holder and support, respectively, and movable with the rising and falling movements of the bed toward and from one of them and coöperating guiding elements on the picker and frame, respectively, for centering the picker during said last mentioned movement to prevent a change in its position on the bed.

13. In a labeling machine, the combination with a frame and a label holder and work support mounted thereon, of a rising and falling bed, a picker movable on the bed into and out of alinement with said holder and support, respectively, and movable with the rising and falling movement of the bed toward and from one of them, a guide on the picker, an operating arm coöperating therewith to move the picker on the bed and a member on the frame coöperating with the guide to center the picker during the movement of the bed and prevent a change in its position on the latter.

14. In a labeling machine, the combination with a work support and a label holder, of a rising and falling bed, a picker movable on the bed into and out of alinement with the holder and work support, respectively, and movable with the rising and falling movements of the bed toward and from one of the latter and means for locking the picker on the bed during said last mentioned movement.

15. In a labeling machine, the combination with a frame having an overhanging bracket projecting therefrom and a work support, of a bottom delivery label holder supported on the bracket, rising and falling bed beneath the label holder, a picker movable on the bed into and out of alinement with the holder and work support, respectively, and movable with the rising and falling movements of the bed toward and from the label holder and work support when in alinement therewith, and members on the frame coöperating with the guide on the picker to center the latter during its movement toward the label holder and work support, respectively.

16. In a labeling machine, the combination with a label holder and a work support, of a picker having reciprocatory movement in one direction into and out of alinement with said members, respectively, and reciprocatory movement in another direction toward and from each of them and a movable bed forming a sliding support for the picker, the latter being arranged to travel relatively to the bed during one movement and conjointly therewith during the other.

17. In a labeling machine, the combination with a label holder and a work support, of a picker having reciprocatory movement in one direction into and out of alinement with said members, respectively, and reciprocatory movement in another direction toward and from one of them, a movable bed forming a sliding support for the picker, the latter being arranged to travel relatively to the bed during one movement and conjointly therewith during the other and means for centering the picker on the bed during the conjoint movement of the bed and picker.

18. In a labeling machine, the combination with a frame having a label holder and work support mounted thereon, of a picker having reciprocatory movement in one direction into and out of alinement with said members, respectively, and reciprocatory movement in another direction toward and from one of them, a movable bed forming a sliding support for the picker, the latter being arranged to travel relatively to the bed during one of its movements and conjointly therewith during the other and coöperating guiding elements on the frame and picker, respectively, for centering the latter on the bed during the conjoint movement of the bed and picker.

19. In a labeling machine, the combination with a main frame, comprising front and rear standards, of a rearwardly extending bracket on the front standard, a bottom delivery label holder carried on the bracket, a forwardly extending bed beneath the bracket having a stem guided vertically on the rear standard, a picker sliding on the bed into and out of vertical alinement with the label holder, means for actuating the picker and means for raising and lowering the bed to carry the picker toward and from the labels.

20. In a labeling machine, the combination with a main frame embodying a yoke-shaped standard and a work support, of a pair of vertical guide rods extending through the yoke in substantially the same plane therewith, a stem having a pair of guiding lugs coöperating with the rods within the yoke and another pair coöperating therewith beyond the yoke, a bed on the stem, a label manipulating device slidable horizontally on the bed, means for actuating it thereon into and out of vertical alinement with the work support and means for actuating the bed on its guides to carry the device toward and from the work support.

21. In a labeling machine, the combination with a main frame comprising front and rear standards and a drive shaft extending from front to rear of the machine and journaled in the standards, of a label holder and work support carried on opposite sides of the front standard, a rising and falling bed guided on the rear standard, a picker having horizontal sliding movement on the bed into and out of vertical alinement with the label holder and work support, respectively, and a conjoint movement with the bed toward and from one of said parts, an adhesive distributer having intermittent engagement with the picker and guided vertically in the front standard and actuating mechanism for the picker and distributer, respectively, arranged between the standards and operated by the drive shaft.

22. In a labeling machine, the combination with a work support, a label holder and a picker for transferring labels from the holder to the work support, of a stationary adhesive receptacle, a reciprocating carrying member, a distributing roller on the latter for drawing adhesive from the receptacle and applying it to the picker and a stripper on the carrying member for transferring the label from the picker to an article on the work support.

23. In a labeling machine, the combination with a work support, a label holder, and a picker for transferring labels from the holder to the work support, of a stationary adhesive receptacle arranged above the work support, a vertically reciprocating carrying member and a distributing roller on the latter for drawing adhesive from the receptacle and applying it to the picker and a stripper on the carrying member for transferring the label from the picker to an article on the work support.

24. In a labeling machine, the combination with a main frame comprising a standard, a shaft in rear thereof, a work support arranged forwardly of the standard, an adhesive receptacle above the work support, a label holder and a picker for transferring labels from the holder to the work support, of a vertically reciprocating carrying frame extending through the standard having a rearwardly offset driving portion coöperating with the driving shaft and a forwardly offset portion guided in the standard, and a distributing roller on the carrying frame for drawing adhesive from the receptacle and applying it to the picker.

25. In a labeling machine, the combination with a main frame comprising a standard, a shaft in rear thereof, a work support arranged forwardly of the standard, a label holder, a picker for transferring labels from the holder to the work support and means for applying adhesive to the picker, of a vertically reciprocating carrying frame extending through the standard having a rearwardly offset driving portion coöperating with the driving shaft and a forwardly offset portion guided in the standard and a stripper on the carrying frame for transferring labels from the picker to an article on the work support.

26. In a labeling machine, the combination with a frame, a work support and label affixing devices coöperating therewith, of a pair of bracket arms on the frame, each provided with a guiding groove on the top and one on the side adjacent to the other arm, a label box adjustable in the side grooves, a picker movable between the work support and label box, a follower for the latter, and follower supporting devices adjustable in the top grooves of the arms.

27. In a labeling machine, the combination with a label box, a work support, label affixing devices coöperating therewith and a picker for transferring labels from the box to the support, of a pivoted guiding member overhanging the box and a follower guided in the member to bear against a pile of labels in the box and be withdrawn therefrom with a swinging movement of the member on its pivot.

28. In a labeling machine, the combination with a support having two guides thereon, a label box adjustable in one guide, a work support, label affixing devices coöperating therewith and a picker for transferring labels from the box to the support, of a standard adjustable in the other guide to follow the movements of the box, a guide bar on the standard and a follower guided in the bar to bear against a pile of labels in the label box.

29. In a labeling machine, the combination with a label box, a supporting standard at each side thereof, a work support, label affixing devices coöperating therewith and a picker for transferring labels from the box to the support, of a guide bar spanning the box and having one end pivoted to one standard and the other end coöperating with the other standard and a follower guided in the bar to bear against a pile of labels in the label box.

30. In a labeling machine, the combination with a label box and a supporting standard at each side thereof, a work support, label affixing devices coöperating therewith and a picker for transferring labels from the box to the support, of a guide bar spanning the box and having its ends pivoted respectively to the standards on removable pivot pins and a follower guided in the bar to bear against a pile of labels in the label box.

31. In a labeling machine, the combination with an adjustable label box, guides at opposite sides thereof, a work support, label affixing devices coöperating therewith and a picker for transferring labels from the box to the support, of a pair of standards adjustable in the guides to follow the adjustments of the label box, a bar having its ends supported in the standards and a follower guided in the bar to bear against a pile of labels in the label box.

32. In a labeling machine, the combination with a pair of spaced brackets provided with two sets of guides, a label box depending between the brackets and adjustable on one set of the guides, a work support, label affixing devices coöperating therewith and a picker for transferring labels from the box to the support, of a pair of standards adjustable on the other set of guides to follow the movements of the box, a bar spanning the latter and having its ends supported in the standards and a follower guided in the bar to bear against a pile of labels in the box.

33. In a labeling machine, the combination with a bottle support, of a carrier having a body wiper arm thereon arranged to reciprocate past the support, a fixed guiding socket arranged to converge with respect to the path of movement of the body wiper arm in the direction of longitudinal extent of the bottle, and a neck wiper carrier slidable bodily in the socket and operated by the body wiper arm.

34. In a labeling machine, the combination with a bottle support, of a carrier having a body wiper arm thereon movable past the support, a guide therefor, a second stationary guide independent of the first and a neck wiper carrier having a bodily rectilinear movement in the latter and operated by the body wiper arm.

35. In a labeling machine, the combination with a bottle support, of a carrier having a body wiper arm thereon movable past the support, a guide adjustable to different angles with respect to the path of movement of the body wiper arm, a neck wiper carrier having bodily movement in the guide and operating connections between it and the body wiper arm.

36. In a labeling machine, the combination with a bottle support, of a carrier having a body wiper arm movable past the support and also having a lateral movement relatively thereto, of a guide arranged on a fixed pivot to have a lateral pivotal movement relatively to the support, a neck wiper carrier movable in the guide past the support and connections between it and the body wiper arm.

37. In a labeling machine, the combination with a bottle support, of a carrier having a body wiper arm thereon movable past the support and also having a lateral movement relatively thereto, of a guide having an adjustable inclination with respect to the path of movement of the body wiper arm and a pivotal movement laterally of the support and a neck wiper carrier movable in the guide and operated by the body wiper arm.

38. In a labeling machine, the combination with a bottle support, of a carrier having a body wiper arm thereon movable past the support, a guide inclined to the path of movement of the body wiper arm, a neck wiper carrier movable in the guide, a slot and pin connection between the latter and the other carrier and means for operating one of them.

39. In a labeling machine, the combination with a bottle support, of a carrier having a body wiper arm movable past the support and also having a lateral movement relatively thereto, of a guide inclined with respect to the first mentioned path of movement of the body wiper arm, and a pivotal movement laterally of the support, a neck wiper carrier movable in the guide, a swiveled bracket on the arm having a slot and pin connection with the neck wiper carrier, and means for operating the first mentioned carrier.

ALBERT T. WEISS.

Witnesses:
RUSSELL B. GRIFFITH,
NELSON H. COPP.

---

Copies of this patent may be obtained for five cents each, by addressing the "Commissioner of Patents, Washington, D. C."